(No Model.)

E. R. DE WOLFE.
VALVE FOR PNEUMATIC TIRES.

No. 480,400. Patented Aug. 9, 1892.

Witnesses:
J. Staib
Chas. H. Smith

Inventor:
Edward R. De Wolfe
per Lemuel W. Serrell
Atty.

UNITED STATES PATENT OFFICE.

EDWARD R. DE WOLFE, OF NEW YORK, N. Y.

VALVE FOR PNEUMATIC TIRES.

SPECIFICATION forming part of Letters Patent No. 480,400, dated August 9, 1892.

Application filed April 18, 1892. Serial No. 429,523. (No model.)

*To all whom it may concern:*

Be it known that I, EDWARD R. DE WOLFE, a citizen of the United States, residing in the city, county, and State of New York, have invented a new and useful Improvement in Valves for Pneumatic Cycle-Tires, of which the following is a specification.

My invention is designed as an improvement upon the valve shown and claimed in Letters Patent granted to me October 6, 1891, No. 460,714. In my valve as set forth in said patent there was a screw-disk within the tubular cylindrical case for seating the perforated plug and elastic device and for holding them in place. This necessitated the carrying and use of a screw-driver by the wheelman for deflating the tire; besides, the parts were expensive to manufacture.

The object of my present invention is to dispense with said disk and to simplify the construction and lessen the cost.

In carrying out my invention I employ a tubular cylindrical case with a disk connected to one end of the case, which disk is adapted to be molded into the rubber composing the inner expansible air-tube. The other end of said tubular cylindrical case is screw-threaded, and I employ a perforated cylindrical head having a tubular base adapted to screw upon the case, and I prefer to employ an imperforate cap or plug, threaded and adapted to screw upon the perforated cylindrical head for closing the opening therein and preventing the entrance of water or dirt.

The elastic air-retaining device that I employ in connection with this case for permitting the entrance of air, and which closes automatically to prevent its escape, consists of a perforated plug and rubber sleeve.

Figure 1:
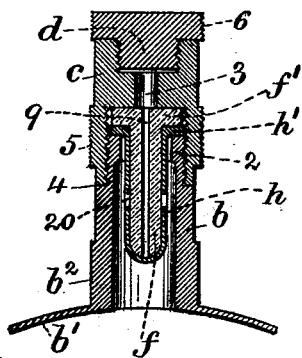
Figure 3:
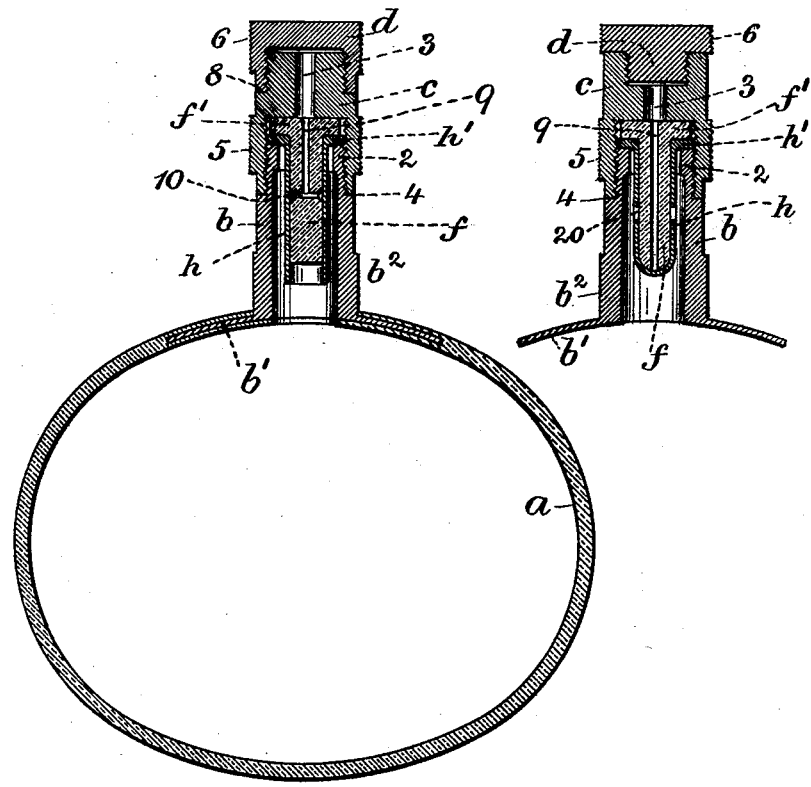
Figure 2:
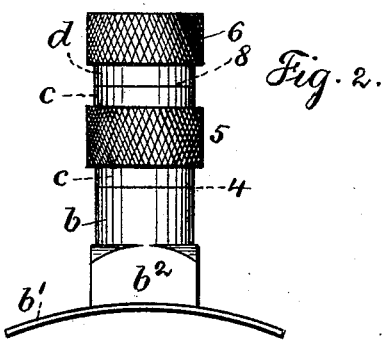

In the drawings Figure 1 represents a vertical section of my improved valve-case and valve. Fig. 2 is an elevation of the case, and Fig. 3 is a vertical section of my case and air-valve and a cross-section of an inner inflatable tube. These figures are of exaggerated size for clearness.

$a$ represents the inflatable or hollow expansible tube of rubber. This is the inner air-tube of the pneumatic tire, the other parts of the tire and the rim of the bicycle-wheel not being shown in the drawings because they are of well-known form and do not require illustration or description.

The tubular cylindrical case of metal is represented at $b$, and the same is preferably made with a disk $b'$ at one end, which disk is molded into the rubber composing the expansible tube $a$, and is held therein when the rubber is vulcanized. This case $b$ is preferably made with a square shoulder at $b^2$, and the upper end is slightly reduced and threaded at 2.

$c$ represents the cylindrical head perforated centrally at 3. The lower portion of this head is tubular and internally threaded and screws upon the cylindrical case $b$, the edges of the metal meeting and forming a tight joint at 4, and the surface of this head is knurled at 5, so that it may be readily turned by the fingers in screwing it down to place or in unscrewing it. The upper end of the perforated head $c$, Fig. 3, I prefer to make slightly reduced and threaded with a shoulder at 8, and an imperforate cap or cover $d$ screws upon the head down to a tight joint at the shoulder 8, completely shutting out of the case dust and water. This cap or cover $d$ is also knurled upon the outer surface at 6, so that it may be readily turned by the fingers.

In Fig. 1 I have shown a modified form of cap or cover $d$ in the form of a threaded and knurled plug adapted to screw into a threaded recess in the outer end of the perforated head $c$.

The elastic device that I employ for permitting the entrance of air, but closing automatically to prevent its escape, consists of the cylindrical plug $f$ and its head $f'$, preferably of hard rubber, and the surrounding soft-rubber sleeve $h$, having one end $h'$ thickened to form a ring or flange.

The elastic device is shown in Fig. 1, and consists of a plug $f$ with a central hole throughout its length and a rounded lower end, and the rubber sleeve $h$ has a closed lower end curved to fit around the plug, and at 20 the sleeve is perforated with a knife-point to permit of the entrance of the air in filling or inflating the air-tube.

In Fig. 3 the parts are like those in my former patent, wherein the plug $f$ has a central hole 9 and a lateral hole 10, and I prefer to make the circumferential groove around the plug at the hole 9 to facilitate the delivery of the air into the tube $a$, the device operating as set forth in my said patent. The head $f'$ of the plug and the thickened end $h'$ of the sleeve fit within the tubular portion of the head and rest against the inner face of the head and between the same and the end of the tubular case $b$, and the proportions of the parts are such that when the head $c$ is screwed down to place upon the case $b$ the plug and rubber are nipped and held to place, the rubber end $h'$ being compressed and spread.

An air-pump for filling the tire $a$ is either screwed directly or by its coupling to the head $c$ when the cap or cover $d$ is removed.

I do not limit myself herein to the precise form of elastic device for permitting the entrance of air, but closing automatically to prevent its escape, as the same may be varied without departing from the construction of the case.

I claim as my invention—

1. The herein-described air-valve, consisting, essentially, of a tubular cylindrical case with a flat seat at the upper end, a perforated cylindrical head screwing upon the said case with a flat inner portion forming a seat, and an air-retaining device for permitting the entrance of air but closing automatically to prevent its escape and having a ring or flange held between the seats of the respective parts where an air-tight joint is formed, substantially as set forth.

2. The herein-described air-valve, consisting, essentially, of a tubular cylindrical case $b$, a disk $b'$, connected to one end thereof and the other end threaded and having a seat at the upper end, a perforated cylindrical head $c$, having a tubular portion adapted to screw upon the case $b$ and having an internal seat, an imperforate cap or cover $d$ for closing the opening in the head $c$, and an elastic air-retaining device for permitting the entrance of air but closing automatically to prevent its escape, having a ring or flange held by the clamping action between the seats, where an air-tight joint is formed, substantially as set forth.

3. The combination, with the inflatable or hollow expansible tube $a$, of the tubular cylindrical case $b$, its disk $b$, molded into the tube $a$, its square shoulder $b^2$ and having its upper end reduced and threaded, the perforated and tubular cylindrical head $c$, having a knurled surface and screwing upon the case $b$ and having a reduced and threaded portion, the imperforate cap or cover $d$, also having a knurled surface and closing the opening in the head $c$, the perforated plug $f$ and head $f'$ of hard rubber, and the soft-rubber sleeve $h$ with a thickened end $h'$, substantially as set forth.

4. The herein-described air-valve, consisting, essentially, of a tubular cylindrical case $b$, a perforated cylindrical head $c$, screwing upon said case, and the longitudinally-perforated hard-rubber plug $f$, having a head $f'$ and rounded end, the soft-rubber sleeve $h$ with a thickened end $h'$, and a closed end covering the opening in the plug and perforated at 20, substantially as specified.

Signed by me this 13th day of April, A. D. 1892.

E. R. DE WOLFE.

Witnesses:
GEO. T. PINCKNEY,
HAROLD SERRELL.